United States Patent [19]

Cullity et al.

[11] Patent Number: 5,394,959
[45] Date of Patent: Mar. 7, 1995

[54] SCISSOR LIFT APPARATUS FOR WORK PLATFORMS AND THE LIKE

[75] Inventors: Richard E. Cullity, La Mirada; David P. Engvall, Crestline, both of Calif.

[73] Assignee: Simon Aerials, Inc., Milwaukee, Wis.

[21] Appl. No.: 991,218

[22] Filed: Dec. 15, 1992

[51] Int. Cl.⁶ .............................................. B66B 11/04
[52] U.S. Cl. .................................... 187/244; 254/122; 180/140; 187/269
[58] Field of Search ................ 187/18, 9 R, 8.71, 8.72; 182/141; 254/122, 89 R; 180/140, 132; 188/152

[56] References Cited

U.S. PATENT DOCUMENTS

| | | | |
|---|---|---|---|
| 93,877 | 8/1809 | Haasz | 187/18 |
| 366,365 | 7/1887 | Averberg | 254/122 |
| 2,228,631 | 1/1941 | Kuiper | 188/152 |
| 2,533,980 | 12/1950 | Weaver | 254/89 |
| 3,174,722 | 3/1965 | Alm | 187/18 |
| 3,237,921 | 3/1966 | Jay | 187/18 |
| 3,558,103 | 1/1971 | Lodige | 254/122 |
| 3,672,104 | 6/1972 | Luckey | 52/109 |
| 3,700,070 | 10/1972 | King | 182/16 |
| 3,970,349 | 7/1976 | Banys | 312/268 |
| 3,983,960 | 10/1976 | Sikli | 187/18 |
| 3,991,857 | 11/1976 | Wolk et al. | 187/18 |
| 4,114,854 | 9/1978 | Clark | 254/122 |
| 4,130,178 | 12/1978 | Smith, Jr. | 182/141 |
| 4,171,120 | 10/1979 | Clark | 254/1 |
| 4,175,644 | 11/1979 | Sikli | 52/109 |
| 4,194,723 | 3/1980 | Grove et al. | 254/122 |
| 4,684,314 | 8/1987 | Luth | 414/245 |
| 4,858,482 | 8/1989 | Knudsen | 74/110 |
| 4,973,069 | 11/1990 | Edahiro et al. | 180/140 |
| 5,105,915 | 4/1992 | Gary | 187/18 |

FOREIGN PATENT DOCUMENTS

| | | | |
|---|---|---|---|
| 883107 | 10/1971 | Canada | 187/18 |
| 933099 | 9/1973 | Canada | 187/18 |
| 583091 | 12/1977 | U.S.S.R. | 254/122 |

*Primary Examiner*—Kenneth W. Noland
*Attorney, Agent, or Firm*—Andrus, Sceales, Starke & Sawall

[57] ABSTRACT

A scissors lift apparatus has three scissor units for supporting heavy loads. A central scissor unit has its arms located inwardly of the immediately lower and upper scissor units, and folds into the upper and lower scissor units for storage within a chamber in a mobiled chassis. The scissor arms of the upper and lower scissor units includes rectangular box beams with a greater vertical than horizontal dimension. Hydraulic cylinders are located within and coupled to the opposite two arms of the center scissor unit to expand and collapse the same. The mobile chassis has front steering wheels mounted with hydraulic powered-caster-type wheel drive and steering apparatus. The steering king pin is laterally offset from the vertical plane through the center of wheel. A dual fail safe braking unit on the trailing wheels has an applied hydraulic cylinder unit including a floating cylinder with a single spring applied piston and rod which is supported in a fixed journal and connected to one wheel. An internal compression spring maintains the rod extended except when over loading by hydraulic pressure. A second rod is secured to the cylinder and is releasably coupled to the second wheel.

23 Claims, 7 Drawing Sheets

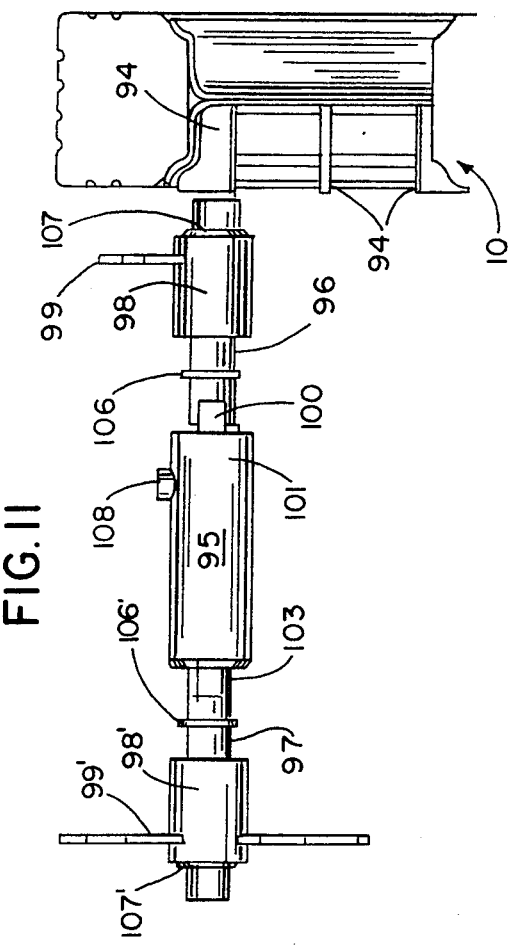
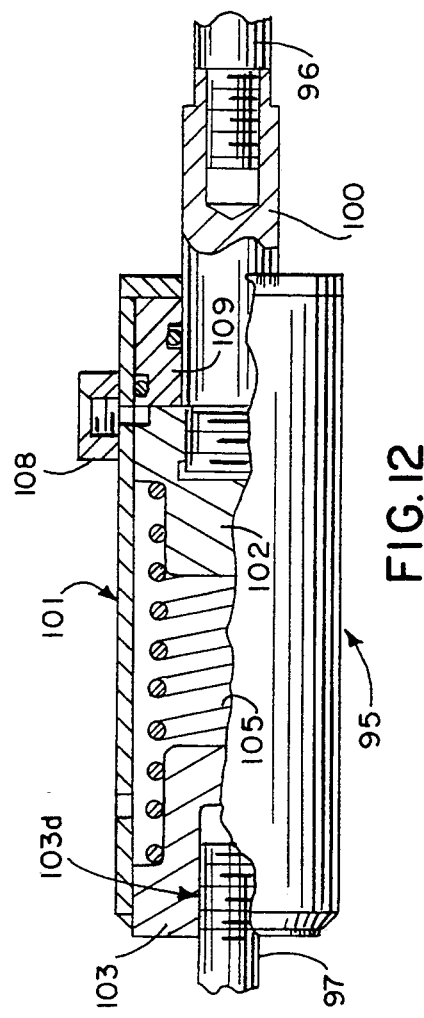
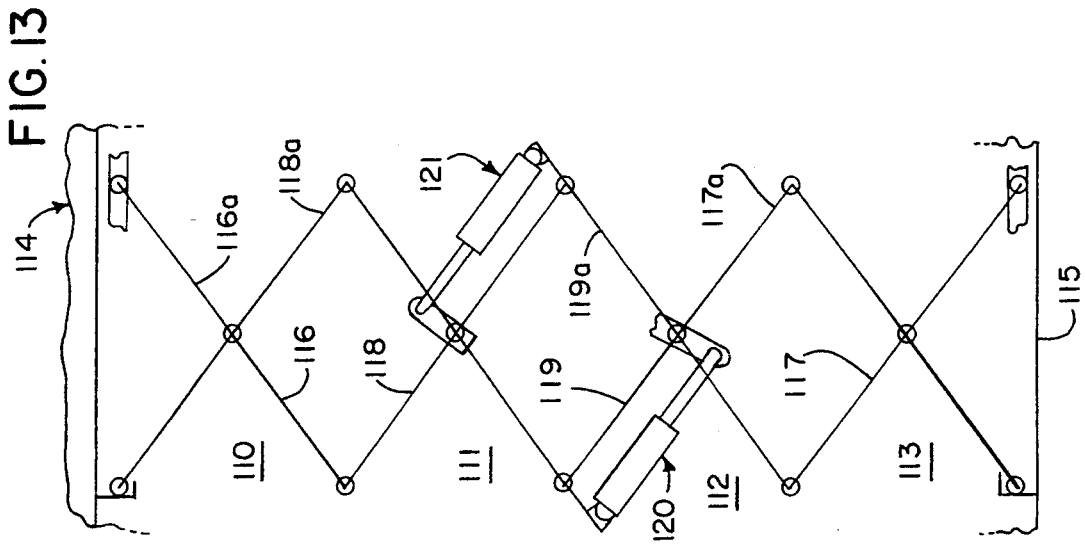

SCISSOR LIFT APPARATUS FOR WORK PLATFORMS AND THE LIKE

BACKGROUND OF THE INVENTION

This invention relates to a scissors lift apparatus for work platforms and other similar scissor lift apparatus for elevating of substantial load support units.

Scissor lift apparatus is often employed for raising and lowering of work support structures. Thus, in construction, servicing of utility lines and other elevated equipment requires mobile lift apparatus which is collapsed for transport purposes between locations. The lift apparatus includes a powered lift platform for supporting of work personnel in an elevated location at a work site. Various forms of powered elevating equipment including telescoping booms, scissors lift apparatus and the like are used. Various scissors lift apparatus are shown in the prior art and reference may be made to U.S. Patents, as follows:

| U.S. Pat. No. | Inventor |
|---|---|
| 93,877 | Haasz |
| 366,365 | Averberg |
| 2,533,980 | Weaver |
| 3,558,103 | Lodige |
| 3,672,104 | Luckey |
| 3,700,070 | King |
| 3,970,349 | Banys |
| 3,991,857 | Wolk et al |
| 4,114,854 | Clark |
| 4,130,178 | Smith, Jr. |
| 4,171,120 | Clark |
| 4,175,644 | Sikli |
| 4,684,314 | Luth |
| 4,858,482 | Knudsen |

Typically, a pair of laterally spaced and similar scissor units are secured to a mobile chassis and to a platform. Hydraulic cylinder units are coupled between the base support and the first set of scissors to expand and contract the scissors lift apparatus. Generally, each scissor unit includes a plurality of scissors which are secured in stacked relationship for lifting and lowering of the platform. An alternative system has disclosed a plurality of single scissors in stacked relation for raising and lowering of the platform.

Because of the heavy loads encountered, the scissors in multiple scissor units are mounted with the arms of each scissor in alignment and collapsed downwardly on to each other to establish and maintain a reliable and stable support of the loads. The arms of each scissor are therefore substantial and generally formed of box-like beams. The collapsed position establishes a minimal vertical stored position equal to the stacked thickness of the arms in each scissor.

Various applications which require substantial elevations use three or more scissors interconnected in stacked relationship to obtain the necessary elevation. Although providing particularly satisfactory and stable supports, the scissors will generally have a very significant collapsed height. As a result, mobile units have a corresponding vertical height with a heavy top load. The stability of the unit, therefore, may present certain difficulties in transport, particularly over uneven or rough terrain.

U.S. Pat. No. 3,558,103 particularly discusses and notes that the scissors lift apparatus is desirably formed with a minimum vertical height in a collapsed position.

Generally, in the prior art of multiple section scissors lift systems used for elevating of load platforms and the like, a separate four wheel chassis is provided with various hydraulic and electrical sources and power supplies mounted to the chassis. The chassis is formed with an upper support structure generally of a length equal to the collapsed scissors lift apparatus and a width slightly greater than the width of the scissors lift apparatus. The power and control mechanism is located beneath the base support structure for the scissors lift apparatus. This further increases the overall vertical dimension of the collapsed apparatus.

Further, to minimize the overall width of the system of a mobile unit for convenient over-the-road transport, the base structure for the scissors lift apparatus is generally located above the tire level of the mobile apparatus. This also generates a usable spaced structure beneath the scissors lift support structure for storage of the power and control equipment.

Existing scissors lift apparatus with three and more scissor sections for positioning work platforms and the like has found significant commercial usage because of the support characteristics provided. There is a demand however for improved mobility and stability of the apparatus, particularly for a minimal height of the scissors lift apparatus in the collapsed or folded position for transport and the like.

SUMMARY OF THE PRESENT INVENTION

The present invention is directed to a multiple sectioned scissors lift apparatus having three or more scissor sections or units for supporting of heavy loads and particularly adapted as and for incorporation into a mobile lift apparatus such as a self-contained mobile lift apparatus. Generally, in accordance with the present invention, the scissors lift apparatus includes three or more scissor units, with at least one alternate scissor unit offset and located inwardly of the immediately lower scissor unit and the immediately next upper scissor unit, with such lower and upper scissor units in alignment. Thus, alternate units are aligned and offset laterally with respect to each other such that the alternate close-spaced units fold inwardly within the larger spaced scissor units in the collapsed position and produce a compact, stable lift apparatus. In order to establish and maintain optimum lateral support, each scissor arm in the outer and more widely spaced scissor units is preferably formed as a box beam with a substantially greater vertical dimension when compared with the lateral or horizontal dimension.

The scissors apparatus is powered with a hydraulic motor system which includes, in a preferred optimum construction, power cylinder units located and coupled to an intermediate scissors unit. In one embodiment, a suitable crank-like structure is provided coupling of first and second hydraulic cylinder units to the common connection of the adjacent scissor arms and to the opposite ends of the two arms of the scissor unit to expand and collapse the scissor lift apparatus, with the hydraulic cylinder units located within the spacement between the close-spaced scissors arms or unit. The above structure provides a very compact structure with a minimal vertical dimension in the collapsed position while maintaining all of the necessary stability and strength. Thus, for example, a three sectioned scissors lift unit will collapse to the depth of a conventional two section scissors lift unit.

In accordance with a further aspect of the present invention, the chassis structure is specially built with a central well or chamber unit located between the laterally spaced wheels and within which chamber unit scissors apparatus collapses to a stored position. Power and control chamber units are secured within the longitudinal and/or lateral spacement between the wheels. The chassis is thus constructed generally as a low boy trailer assembly having a central bottom platform structure for supporting of the scissors lift apparatus. The chassis includes walls defining support chambers between the lateral spacement of the vehicle wheels as well as at the opposite ends between the lateral spacement of the vehicle wheels.

To maximize the size of the lift apparatus chamber unit, front steering wheels on the mobile unit in another aspect of the present teaching are mounted with hydraulic powered-caster-type wheel drive and steering apparatus, which provides maximum available space for the lift apparatus chamber unit and contributes to the construction of the compact mobile unit for over-the-road travel with the improved minimal overall vertical height of the apparatus.

In a further feature of the present invention, an improved dual fail safe braking system, particularly for parking of the unit, is applied to the following wheels of the mobile apparatus. In this aspect of the invention, similar mechanically actuated braking elements are provided on each of the following wheels. A single spring applied floating cylinder unit is provided for disengaging of the brake units. In a preferred construction, a hydraulic cylinder unit includes a floating brake cylinder assembly with a compression spring applied piston within the cylinder. The brake cylinder is supported only at each end by braking pins, coupled one each to each end of the cylinder. The piston is coupled to a piston rod projecting from the adjacent first end of the cylinder. The rod is secured to a brake pin and supported in a fixed journal secured to the chassis, and thereby supports one end of the cylinder. The internal compression spring maintains an extended cylinder rod except when a hydraulic pressure is applied sufficient to overcome the spring force. The piston rod, when extended, releasably couples the brake pin to the wheel for braking thereof. The second brake pin is coupled to the second end of the cylinder and is journaled in a fixed journal secured to the chassis. The second brake pin is releasably coupled to the other or second rear wheel when the piston rod is extended and the cylinder extended in the opposite direction. The floating cylinder system provides for convenient and effective braking of both wheels with a controlled balancing of the braking characteristic.

The present invention, in its various aspects, provides a highly improved multiple sectioned scissors lift apparatus for heavy load systems particularly mobile units. The powered caster steering is of course particularly applicable to a mobile unit while the braking system may be employed in the mobile unit of this invention as well as others. The structures disclosed herein are readily constructed with known-day apparatus and technology, and provide cost effective improvements in the art of heavy duty multiple scissors lift apparatus and the like.

BRIEF DESCRIPTION OF THE DRAWINGS

The drawings furnished herewith generally illustrate the best mode presently contemplated for carrying out the invention and are described hereinafter.

In the drawings:

FIG. 11 is an elevational view of a braking system for the following wheels of the mobile unit illustrated in FIGS. 1 and 2; with parts broken away and sectioned to illustrate detail of the structure;

FIG. 12 is an elevational view of a fail safe spring applied brake cylinder shown in FIG. 12; and FIG. 13 diagrammatically illustrates a four section linkage apparatus for a scissor lift work machine.

DESCRIPTION OF THE ILLUSTRATED EMBODIMENT

Figure 1:
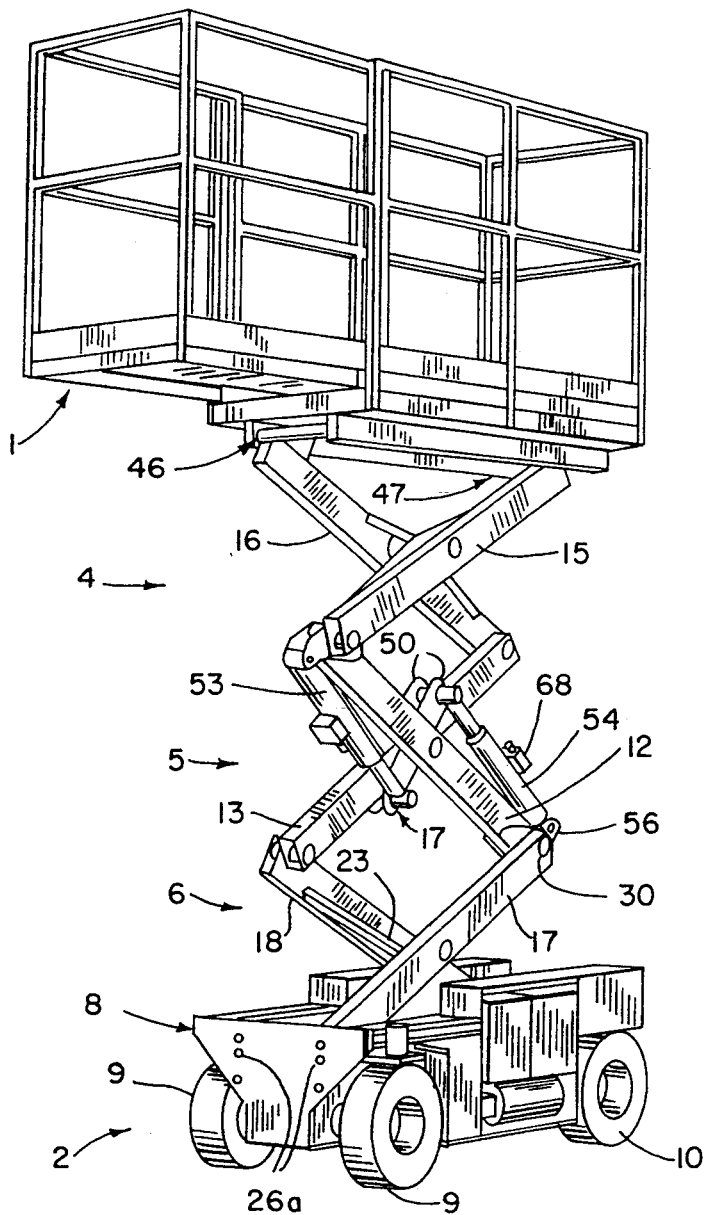
FIG. 1 is a pictorial view of a mobile scissor lift apparatus constructed in accordance with the present invention.
Figure 2:
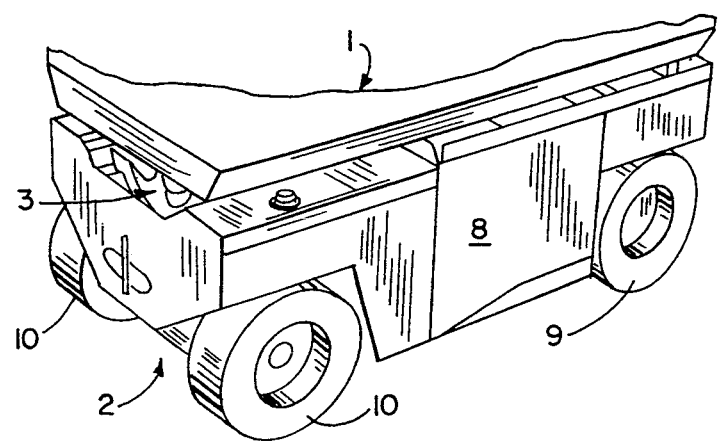
FIG. 2 is a pictorial view of the lift apparatus shown in FIG. 1 in stored state.
Figure 5:
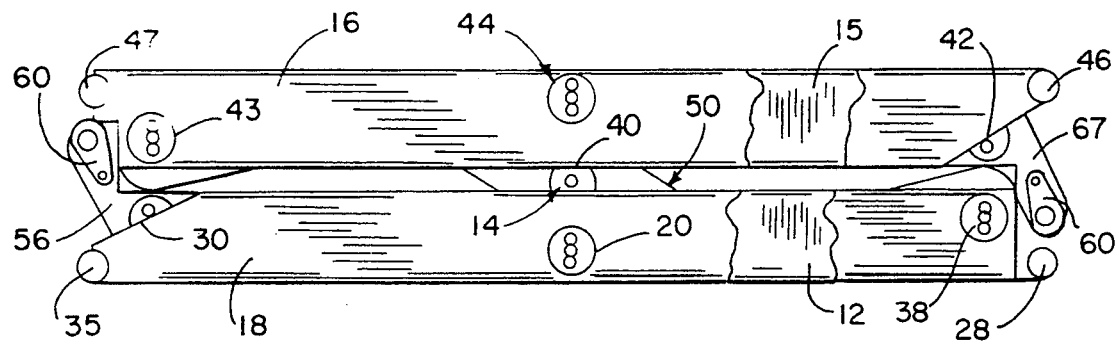
FIG. 5 is a side elevational view of the scissor linkage apparatus in a collapsed store position, with parts broken away and sectioned to show inner detail of the structure.

Referring to the drawings and particularly to FIGS. 1 and 2, a scissor lift apparatus incorporating the teachings of the present invention is illustrated as applied to a work platform unit 1, for supporting of workmen and equipment in a elevated location. The work platform 1 is illustrated as a typical railed unit having an extensive area within which the workmen operate and move. The work platform 1 is mounted to a mobile support unit 2 by a scissor linkage apparatus 3 constructed in accordance with the teaching of the present invention. The scissor apparatus linkage 3 includes three scissor units or linkages 4, 5 and 6 which are interconnected in vertically stacked relation. Scissor linkage 4 is secured to the underside of the work platform 1 and interconnected to the top side of the intermediate scissor linkage 5. The base or bottom scissor linkage 6 is secured to the mobile support unit 2 and to the lower end of the intermediate scissors linkage 5. In accordance with known functioning, the scissor linkages expand and contract in unison between a totally collapsed position shown in FIGS. 2 and 5 and an extended position shown in FIGS. 1 and 3. A motor assembly shown as a piston-cylinder assembly 7 is coupled to the intermediate scissor linkage 5 and serves to expand and contract the linkage 5 and thereby provide simultaneous expansion and contraction of the top and lower linkages 4 and 6. The hydraulic system, as hereinafter described, is provided for powering of the hydraulic cylinder assembly between the raised position and the lowered collapsed position of the platform unit 1 with respect to the support unit 2.

In the illustrated embodiment of the invention, the mobile support unit 2 includes a welded chassis 8 within which the lower scissor linkage 6 is mounted for expansion and contraction. The chassis 8 includes a set of rear follower wheels 9 and a set of front steering wheels 10. The chassis 8 is shown as a self-propelled unit, but may be constructed for trailing by a vehicle, not shown, for transport between various work locations.

Each of the illustrated scissor linkages 4, 5 and 6 is similarly constructed with a scissor arm set. Referring particularly to the linkage 5, a set of scissor arms 12 and 13 are secured in laterally spaced side-by-side relationship with a common central pivot unit 14. The upper linkage 4 has a pair of laterally spaced pivoted scissor arms 15 and 16 with a lateral spacing greater than arms 12 and 13 and secured to the upper ends of arms 12 and 13, respectively. As shown most clearly in FIGS. 1 and 4, the arms 15 and 16 are located, with the increase lateral spacing, to outer side of arms 12 and 13 and are pivotally secured thereto as hereinafter described.

The lower scissor linkage 6 is similarly located beneath the linkage 5 and includes pivoted scissor arms 17 and 18 which are spaced in accordance with the upper scissor arms 15 and 16. The scissor units arms 17 and 18 are similarly connected to the outside of the scissor arms 12 and 13 of the intermediate scissor linkage 5. Arms 17 and 18 are particularly aligned with the scissor arms 15 and 16 of the upper linkage 4.

As a result of this particular alignment, the collapsing of the scissors apparatus results in the folding of the linkage arms 15 and 16 downwardly onto arms 17 and 18 with the intermediate linkage arms 12 and 13 lying within the aligned folded scissor linkages 4 and 6.

The chassis 8 is formed with a central cavity or chamber unit 19 within which the folded scissor apparatus is collapsed. In the collapsed position (FIG. 2), the working platform 1 rests slightly above the top surface structure of the chassis 8, thereby establishing a minimal vertical height for the total assembly, and with the linkage apparatus 3 substantially enclosed within the chamber unit 19 of the chassis structure.

Figures 3, 4:
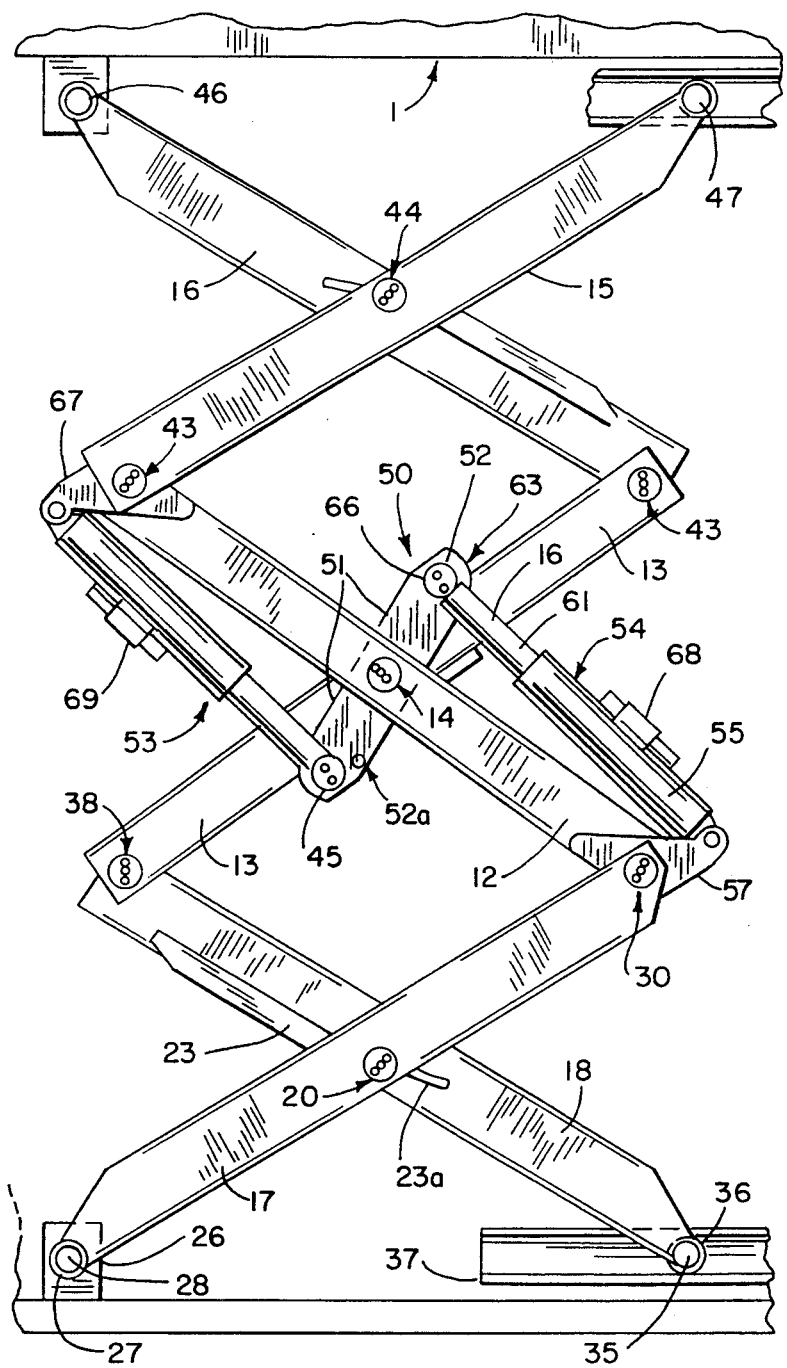
FIG. 3 is an enlarged side elevational view of the scissor linkage apparatus shown in FIG. 1 in the expanded position.
FIG. 4 is an end view of the scissor linkage in a raised position.

Referring to the drawings and particularly to FIGS. 3 and 4, a vertical section of chassis 8 is illustrated illustrating the channel or chamber unit 19 within the chassis for supporting of the folded scissors apparatus 3 therein.

The chamber unit 19 includes opposite and spaced sidewalls 21, and end walls 22 connected to a bottom or base wall 23.

Figure 6:
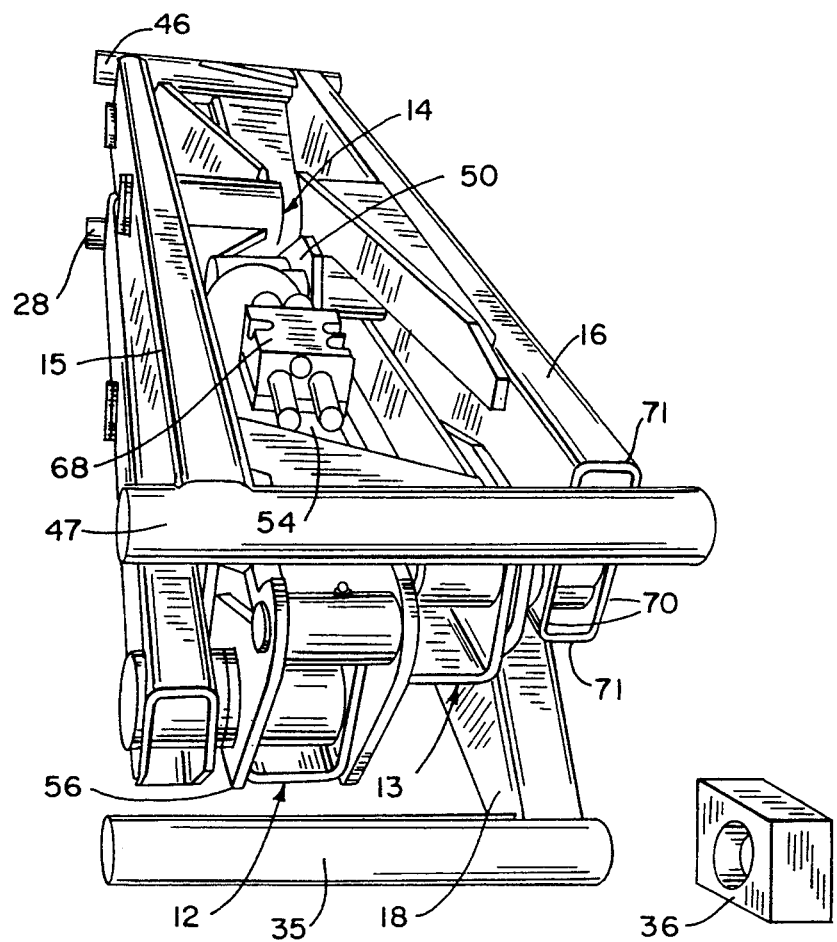
FIG. 6 is a pictorial view of collapsed linkage.
Figure 7:
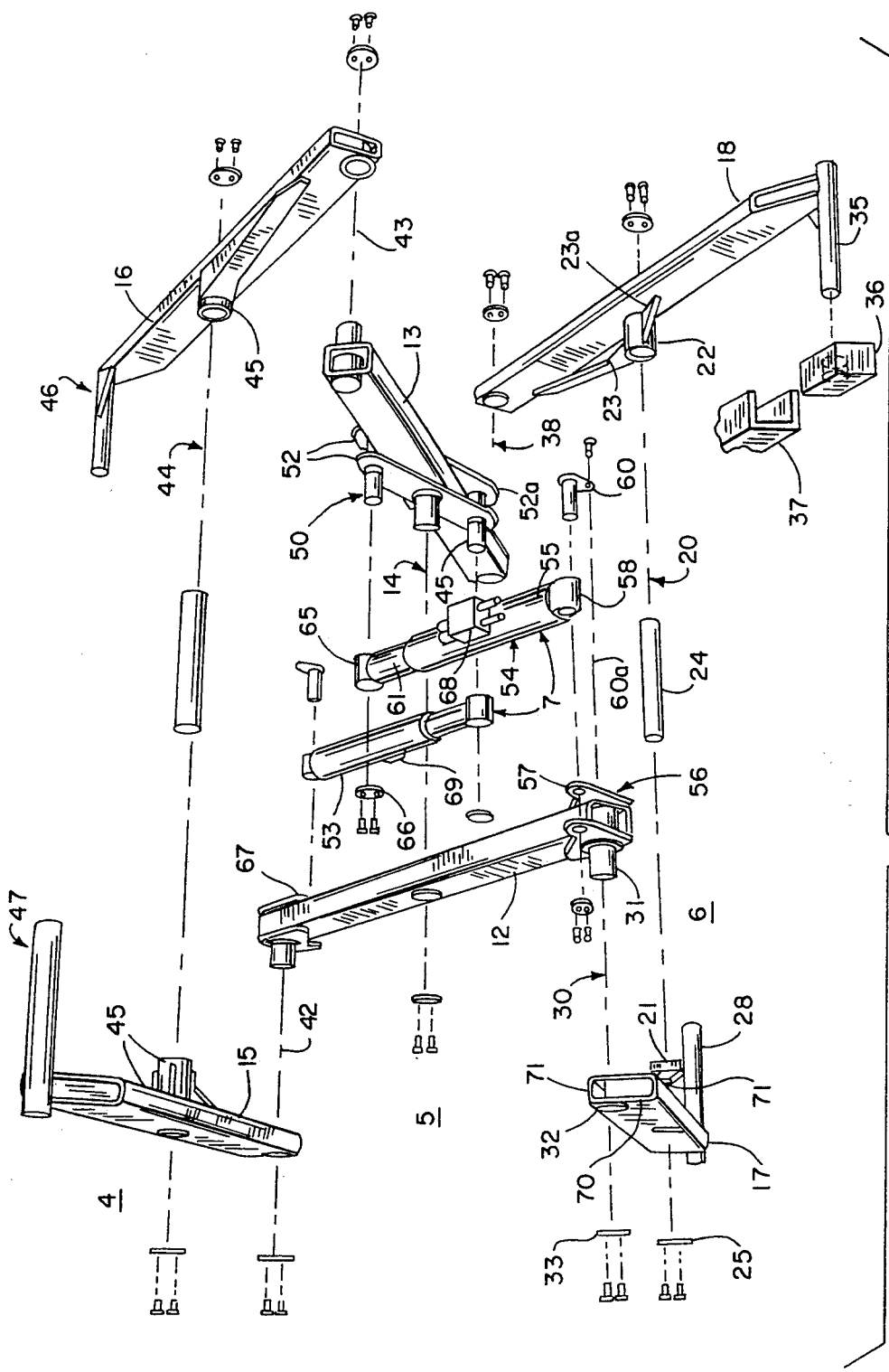
FIG. 7 is an exploded view of the linkage with parts broken away and sectioned.
Figure 8:
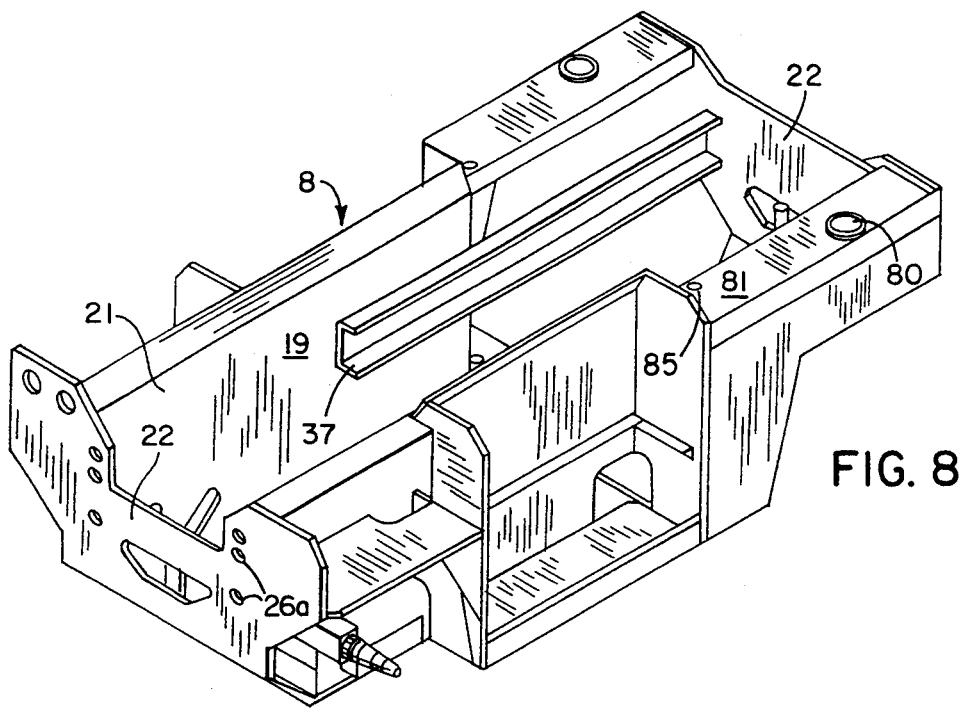
FIG. 8 is a pictorial view of the body for the chassis shown in FIGS. 1 and 2.

The lower most scissor linkage 6 has its lower ends of its arms 17 and 18 secured to the base wall 23 of the chassis chamber unit 19. The scissors arms 17 and 18 are crossed and coupled at a substantially central location by a center pivot unit 20 to allow expansion and contraction of the arms 17 and 18 from the chamber attachment. Pivot unit 20 is a bearing assembly and generally includes similar bearing hubs 24 and 24a secured in appropriate openings in the arms 17 and 18 and projecting toward each other. The bearing hubs 24 and 24a are similarly formed and are welded to the center of the respective arm structures and project inwardly into abutting engagement. Strengthening plates 25 and 25a are secured to opposite sides of the hub and the scissor arm and extend longitudinally of the arm, as shown in FIGS. 1, 6 and 7.

The lower end of arm 17 is pivoted to the base wall of the chassis 8 by a pivot unit. The pivot unit includes a bifurcated bearing bracket 26 attached to the base, as at 26a in FIG. 1. A hub or journal secured within the bracket 26 which projects upwardly from the base with a pivot shaft 28 journaled in hub 27. The shaft 28 is welded to the outer end of arm 17 and extends laterally therefrom into the pivot bracket hub 27.

The second end of the arm 17 projects outwardly from the central pivot unit 20 and is connected at the outer end to the arm 12 of the intermediate or central scissor linkage 5, as at connection 30. The connection 30 includes a bearing shaft 31, shown most clearly in FIG. 7, welded in the end of arm 12 and projecting into a bearing hub 32 which is welded within an opening in the end of arm 17.

The second scissor arm 18 of the lowermost scissor linkage 6 has its lower end slidably connected to the chassis structure, as follows.

A pivot shaft 35 is welded at the end of arm 18, and on the opposite end from the pivoted end of arm 17. The shaft 35 projects laterally from arm 18 beneath the central linkage 5 and the outer end of arm 17. Slide wheels or pads 36 is secured to the outer ends of the shaft and slidably located within generally U-shaped guide channels or tracks 37 which are welded or otherwise fixedly secured to the inner side of the spaced sidewalls 21 of the channel unit 19. A slide pad 36 having an opening within which the end of the shaft is secured is preferred from a cost consideration. The lower end of the second arm 18 of the arm set is thus pivotally mounted to the opposite end portion of the chassis from the fixed pivot unit 26–28 and is longitudinally moveable of the chassis within the tracks 37. The lower ends of arms 17 and 18 are thus held within the chassis 8 and arms move with the required scissor action during expansion and contraction of the lowermost scissor linkage 6.

The opposite end of the second arm 18 extends outwardly beyond the central pivot unit 20 and is pivotally connected to the lowermost end of the arm 13 of the central scissor linkage 5, as at connection 38. The pivot connection 38 between the arms is essentially identical to the connection 30.

The bearing coupling or connection 38 thus includes a central hub member 40 welded within arm 18. A pivot pin 41 is secured within and projects from the arm 13 and is locked in hub 40 to pivotally interconnect the arms.

The arms 12 and 13 cross at the pivot connection or unit 14 and the upper ends are connected by similar pivot connections 42 and 43 to the arms 15 and 16 of the linkage 4. Connections 42 and 43 have the same structure as connections 30 and 38. The crossed arms 15 and 16 are pivotally connected by a center pivot unit 44, which is the same as pivot unit 20 for the linkage 6.

The pivot unit 44, with extended hubs 45, spaces the sets of arms 15 and 16 into alignment with the arms 17 and 18, and fold about the arms 12 and 13 in the folded state as most clearly shown in FIGS. 3a through 6.

The one arm 16 of linkage 4 extends upwardly and is connected by a generally fixed pivot unit 46, which may be constructed generally similar to pivot mounting of the lower linkage arm 17, the base wall 33 and fixed to the underside of the platform 1 to support arm 15 for pivoting relative to the platform. The arm 15 projects upwardly from the pivot unit 44 and is coupled to the underside of the platform by a sliding pad and track units 47 secured to the underside of the platform unit 1. The outer end of arm 15 moves longitudinally of the platform, in a manner similar to that of the arm 18 with respect to the chassis, during the expansion and contraction of the top scissor linkage or unit 4.

The scissor apparatus 3 is expanded and contracted as a unit by the cylinder assembly 7 which is connected to central scissor linkage 5 in the illustrated embodiment of the invention. Referring to FIGS. 3 and 7, the cylinder assembly 7 includes a crank unit 50 secured to center of scissor arm 13 as by welds 51. The crank unit 50 includes a pair of crank arms 52 and 52a spanning the coupling 14 and extending across and at an angle of less than 90° from the arm. The crank arms 52 and 52a are identical elements similarly located to the opposite side of the arm 13. The cylinder assembly 7 including a cylinder unit 53 and a cylinder unit 54 which are similarly connected respectively to the opposite ends of arm 12 of the central linkage 5 and the crank arms 52 and 52a at the opposite ends of the crank unit 50.

Referring particularly to the cylinder unit 54, a cylinder 55 has an outer end pivotally connected to the outer bottom end of the arm 12, as follow. A bifurcated bracket 56 is welded or otherwise firmly secured to the outer end of the arm 12, with the bracket having coupling ears 57 extending outwardly substantially normal to the arm 12, and with pivot openings spaced outwardly of the end of the arm and particularly its pivot connection 30. The end of the cylinder 55 includes a bearing journal 58 which projects into the bifurcated bracket and is secured therein by an appropriate pivot pin 59, which is secured in place by a retainer plate 60 which is welded to the pin and then fixed to the bracket 56 as at 60a, as shown in FIG. 7. A piston rod 61, connected to a piston, not shown, within the cylinder 55, extends outwardly and is coupled to the crank unit 50, and particularly the interior side of the inner crank arm 52, as at connection 63. The pivot connection 63 includes pin 64 welded to the crank arms and extended inwardly from the inner crank arm 52. A journal 65 is welded to the outer end of the piston rod 61 and is journaled on the pin 64, with lock plate 66 secured to the pin.

Figure 3A:
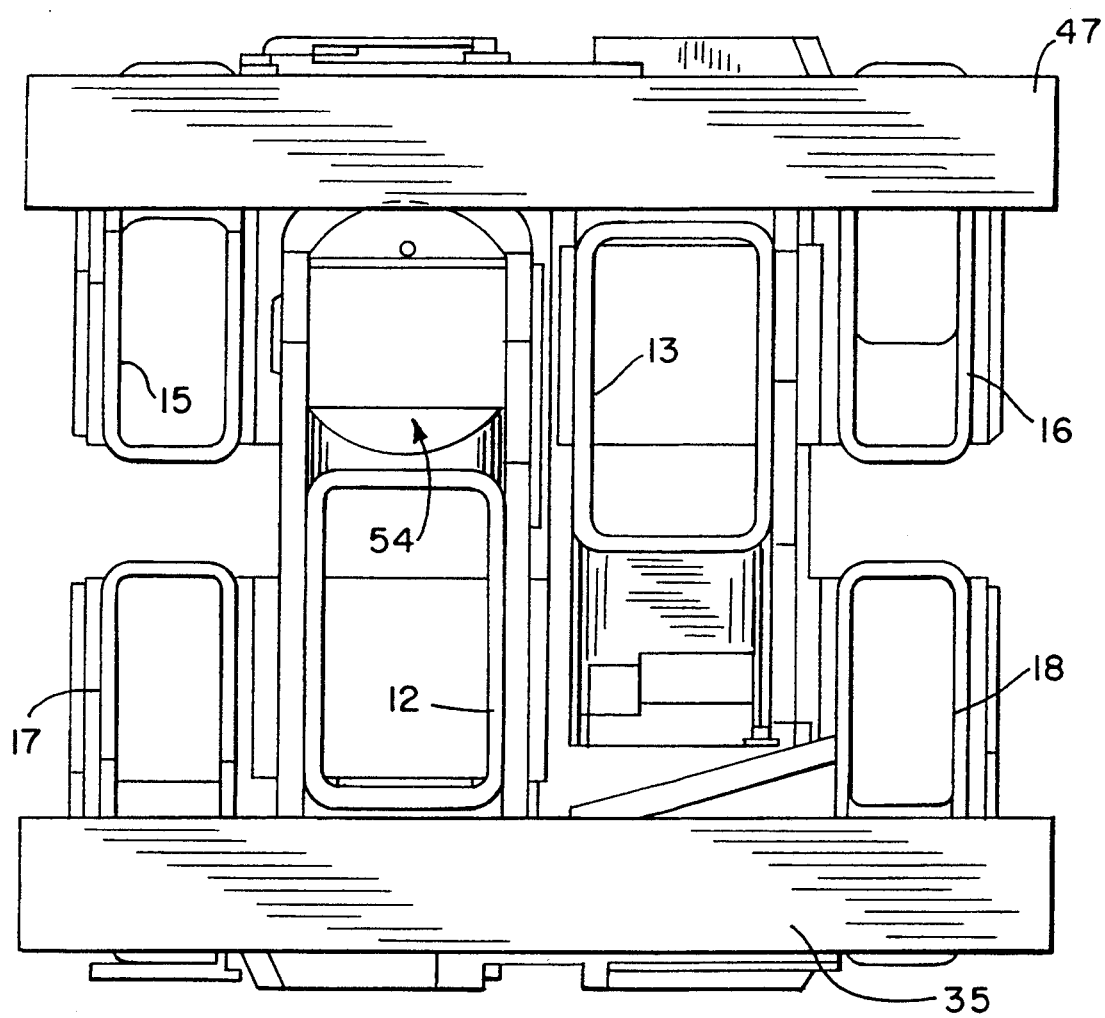
FIG. 3a is an end view of the linkage in a fully down position.

The hydraulic cylinder unit 54 is thus located within the central scissor linkage 5 with the cylinder unit generally parallel to and above the lower end of arm 12 of such linkage in the collapsed position of the linkage 5, as shown most clearly in FIG. 3a.

The cylinder unit 53 is similarly constructed, with its cylinder coupled to the opposite end of arm 12 by an appropriate coupling bracket 67, with its ears projecting downwardly and with its piston rod similarly coupled to the opposite or lower arm 52a of the crank unit 50. Cylinder unit 53 is thereby located within the central linkage 5 and parallel to and below the upper end of arm 12 in the folded or collapsed state.

Each cylinder unit 53 and 54 has a hydraulic source connector including holding valve units 68 and 69 integral with the lift cylinders units 53 and 54. The units 68 and 69 hold the load in case a hydraulic line is ruptured. Hydraulic fluid enters valve passages through a check valve into the cylinder to extend the cylinder. A solenoid, not shown, is part of whole valve body (manifold) plumbed in parallel with check valve. When energized, the solenoid valve allows fluid to leave the cylinder and return to tank. Gravity forces then collapse the linkages and lowers the platform. The fluid lever lines extend downwardly into the chassis and the hydraulic source for simultaneous expansion and contraction of the cylinder units 53 and 54. The cylinder units are thus actuated to expand and contract the central scissor unit 5 and thereby positively and simultaneously corresponding expand and contract the upper and lower scissor units 4 and 6 for positioning the platform.

The cylinder units in the central linkage 5 establish balanced loading of the arms and thereby equal balanced loads to the top and bottom scissor units 4 and 6. This provides for a smooth lift and descent of the linkage and interconnected platform. In contrast, the conventional system using hydraulic cylinder units applied between the chassis and the lowest scissor unit results in platform oscillation which is of course significant and undesirable from the standpoint of the safety and comfort of the personnel as well as the loading and wear on the scissor linkage apparatus.

As shown in FIGS. 3a, 6 and 7, each of the arms 17 and 18 is a rectangular-shaped beam having vertical sidewalls 70, which are substantially longer than the top and bottom lateral walls 71. The center arms 12 and 13 are formed with a more nearly square cross-section. The outer arms are formed to increase the lateral spacing to accommodate the center arms while maintaining the necessary load strength and lateral stability. The rectangular arms are used to provide a minimum width in the assembly while maintaining the necessary overall structural strength within the scissors unit. Thus, the width of each scissors unit is made sufficient to maintain lateral stability while the increased depth functions to positively prevent bending. The narrow arms minimize the spread of the scissors mechanism as well as establishing convenient and effective nesting and collapsing of the scissor units within the narrow chassis as such.

The various arms can be readily formed of available off-shelf rectangular tubing which may be square within the broadest aspect of the invention. Depending upon the weights encountered, a three-to-one ratio or a four-to-one ratio has been found to provide satisfactory commercial stability and support for the rectangular arm structures.

As previously noted, the scissor unit 5 is collapsed generally within the depth of a two linkage unit and in the illustrated embodiment, essentially totally within the chamber unit 19 of chassis 8. The platform unit 1 is located in close spaced relation to the upper surface of the chassis.

The lower or base wall 23 of chassis 8 is supported in relatively close upwardly spaced relation to the ground or other supporting surface to establish a low compact assembly even with relatively large wheel support.

The chassis 8 includes front and back vertical and horizontal walls 22 and 22a welded to the side walls 21 and 21a and forming wheel wells for the front and back wheel sets 9 and 10. The walls also define side chambers within which engines, the hydraulic supply and auxiliary equipment may be mounted stored. In addition, the chassis extends outwardly over the horizontal wheel wall structure defining further areas of equipment and control locations.

The illustrated chassis 8 is constructed to accommodate the front or steering wheel set and rear or following wheel set for transport of the apparatus, as follows.

In the preferred construction of the present invention, the forward steering wheels are specially mounted with a caster-steering support to accommodate the low orientation of the chassis linkage chamber while maintaining reliable effective steering of the mechanism.

Figure 9:
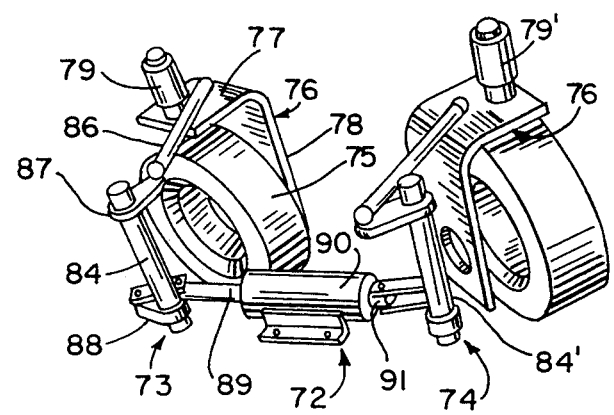
FIG. 9 is a pictorial view illustrating the caster steering apparatus for both of the steering wheels.
Figure 10:
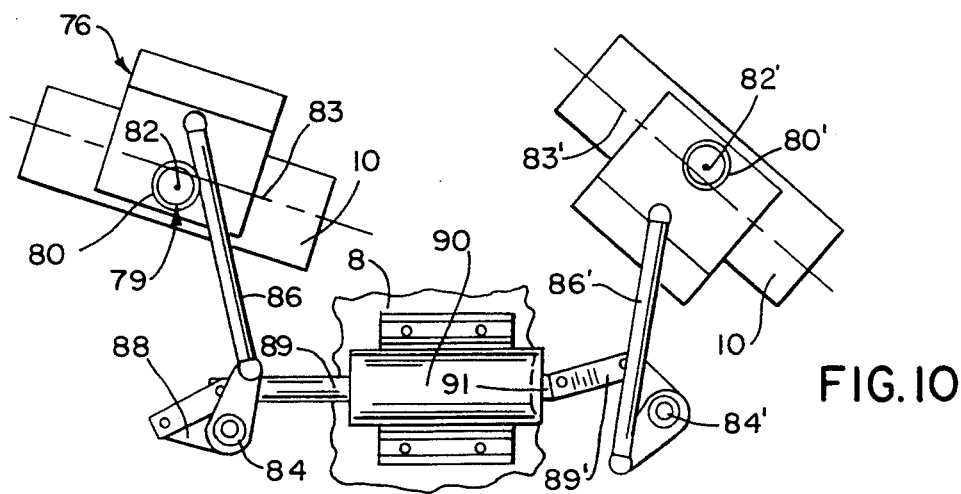
FIG. 10 is a plan view of the caster steering apparatus.

A practical implementation of this aspect of the invention is illustrated in FIGS. 9-10. Referring to FIG. 9, each steering wheel of wheel unit 10 is similarly mounted and coupled to common steering cylinder unit 72 secured, as by bolting, to a center wall of the chassis 8, and coupled to caster steering linkages 73 and 74 for the respective wheels 10.

Caster steering 73 for one wheel 10, shown to the left in FIG. 9, is described, with corresponding elements for the opposite wheel, shown to the right, identified with similar primed numbers.

The wheel 10 is rotatably mounted by a suitable wheel bearing structure to an L-shaped support plate 76 having a horizontal plate leg 77 and a vertical plate leg 78. The outer end of the horizontal plate leg 77 extends outwardly into overlying and upwardly spaced relation to the wheel 75. A king pin 79 is secured to the top of plate leg 77 and is rotatably mounted in a suitable bearing support 80 secured to the overlying horizontal wall 81 of chassis 8. As most clearly illustrated in FIG. 10, the axis 82 of the king pin 79 is off set outwardly from the center plane 83 of the tire and wheel by a relatively short but significant offset. The king pins are placed as far apart from each other as practically possible and thereby as close to the perimeter of the allowed width of the machine. This construction provides a wider wheel stance and thereby improved stability of the machine in moving in a parallel path along a sloping support surface with the platform unit 1 elevated, and particularly in performing a turn, either up or down the slope of the support surface. A jack shaft 84 is pivotally mounted to the chassis wall in rearwardly spaced relation to the kingpin unit 79, as at 85. A tie rod link 86 has end ball couplings connected to plate leg 77 and a crank arm 87 secured to the top portion of jack shaft 84.

The lower portion of jack shaft 84 has a crank arm 88 coupled by a linkage to a piston rod 89 extending from the adjacent end of a cylinder 90 of cylinder unit 72.

The opposite steering caster unit 74 is similarly connected to a piston rod 91 extended from the opposite end of cylinder 90 and creates simultaneous steering of the opposite wheel 10.

The hydraulic cylinder unit 72 includes the fixed power cylinder 90 located generally centrally of the chassis and bolted in place. The piston rods 89 and 91 project laterally outwardly from the power cylinder unit and are oppositely positioned by supply pressure to and from the cylinder. The jack shafts 84 and 84' are similarly pivoted and thereby pivot the wheel assembly about the axis of the king pins 79 and 79'.

The caster steering with the offset of the kingpin axis relative to vertical plane through the wheel and tire provides improved steering and stability of the mobile apparatus when turning of the machine. The offset caster steering also provides a compact steering system and increases the available space for the chamber unit 19 for storage of the lift linkage apparatus 3.

The rear wheels 9 are preferably provided with a dual braking system and a preferred and unique hydraulically actuated dual wheel brake system is disclosed.

Each of the follower wheels 9 is similarly rotatably mounted on a wheel bearing and shaft 92 mounted within the rear tire wells formed by an L-shaped wall structure 93 of the chassis 8. The illustrated wheels are provided with a plurality of circumferentially spaced braking paddles 94 on the interior walls of each wheel.

In a typical installation, five equicircumferentially spaced paddles are provided on each wheel. A centrally located hydraulic cylinder unit 95 is coupled to locate left and right brake pins 96 and 97 which extend from the opposite ends of the cylinder unit 95. The pins 96 and 97 are extended into the spacing between the paddles 94 to provide the desired parking brakes.

Each of the brake pins 96 and 97 is similarly constructed and supported, and the mounting and positioning of pin 96 is described, with similar primed numbers applied to the structure for pin 97. Referring to pin 96, the pin is a rigid rod journaled within a fixed housing 98. Housing 98 is fixedly secured to the underside of the chassis 8 as by suitable welding to a vertical chassis plate 99. The pin 96 projects through the housing and is connected at one end to a piston rod 100 extending from the cylinder unit 95. The other and opposite end of the pin 96 is adapted to be extended into the space between the paddles 94 for braking and retracted therefrom for released rotation of the wheel 9.

The single cylinder unit 95 is specially constructed and mounted to allow single or dual braking.

As shown in FIG. 12, the cylinder unit 95 includes a hydraulic cylinder 101 which is supported by the braking pins 96 and 97. The cylinder 101 is free floating between the fixed housings 98 and 98'. A piston 102 is slidably mounted within the cylinder 101 and connected to piston rod 100 projecting outwardly from the one end of the cylinder, as shown to the right end of FIG. 12, and secured as by a threaded connection to the adjacent brake pin 96.

The opposite or barrel end of the free floating cylinder 101 has an integral outer end wall or plate 103 which has a threaded opening 103a in the center thereof. The brake pin 97 is threaded directly into the opening and extends to the opposite follower wheel.

A fail-safe braking spring 105 is located within the cylinder 101 and urges the piston 102 to the end of the cylinder supporting piston rod 100. The spring simultaneously urges the cylinder 101 to move toward the opposite side of the chassis. Thus, in the normal position, the piston rod and the cylinder unit are extended to a maximum extent and both of the brake rods or pins 96 and 97 project into a space between the wheel braking paddles 94.

The pins 96 and 97 each have a set of snap ring 106 and 107. Snap rings 106 are located between the hydraulic cylinder 101 and the housing 98 and limit the brake engaging movement when the cylinder expands. Snap rings 107 are located between the housing 98 and the end of pin 96 and 97 to limit the stroke or travel and movement of the brake pins when the cylinder retracts. The location of the snap rings also creates equal engagement and disengagement of pins from paddles. The ring 106 and 107 thus similarly limit the movement of the hydraulic cylinder 101 and the braking pins 96 and 97.

A hydraulic source connector 108 is secured to the cylinder 101 for supplying of pressurized hydraulic fluid, and particularly of oil, to the cylinder between the piston 102 and the piston rod cylinder gland 109. With hydraulic pressure applied to the cylinder unit, the piston 102 retracts into the cylinder 101 compressing the bias spring 105 as a result of relative movement between the piston and cylinder. The rods are thus retracted and the wheels are free to rotate. The movement is limited by the outer snap rings 107 and 107' secured to each of the brake pins 96 and 97. The stroke of the hydraulic cylinder unit is made equal to twice the spacing of the snap rings 106 and 107 with respect to the housing. Thus, with pressure applied, the piston retracts pin 96 until the snap ring engages housing 98 after which the cylinder 101 moves to retract the pin 97 until the ring 107' engages the housing 98'. Both of the brake pins are thereby positively moved to the release position in response to application of pressure and similarly moved to a braking position when the pressure is relieved. Release of the hydraulic pressure and drainage of the oil allows the spring 105 to extend the cylinder 101 and piston relative to each other until the outer snap rings 97 and 97' engage the outer housing 107 and 107'.

This permits dual braking with a single hydraulic cylinder unit and provides a highly significant simplification in the braking system compared to more conventional practice. Conventional practice has provided duplicate hydraulic cylinder units for dual braking. The present unique braking is particularly adapted to the present scissor apparatus in minimizing the space required for mounting of a dual braking system within the chassis structure and between the two wheels.

A preferred embodiment of the scissor lift apparatus as illustrated provides an optimum construction with an improved scissors lift apparatus which can be readily collapsed to a minimum vertical compact height in combination with an improved steering apparatus for mobile lift apparatus and an improved dual braking system for mobile lift apparatus.

The central location of the lifting cylinder assembly establishes a particularly smooth movement of the scissor apparatus. A four arm section lift apparatus is diagrammatically shown in FIG. 13 including four scissor units or linkages 110, 111, 112 and 113 secured in vertically connected orientation. The top and bottom linkages 110 and 113 are connected to the platform 114 and the bottom support unit 115 as in the three linkage apparatus and are further formed with the respective scissor arms 116, 116a and 117, 119a in vertical alignment and spaced to the outside of the two central scissor linkages 111 and 112. The two scissor linkages 111 and 112 are similar structured with the respective scissor arms 118, 118a, 119 and 119a in vertical alignment and within the spacement of the aligned scissor arms 116, 116a, 117 and 117a.

The scissor apparatus includes a hydraulically activated assembly with first and second cylinders 120 and 121 for raising and lowering the scissor units. The first cylinder unit 120 is connected to arms 118 and 119 of the scissor unit 111 and the second cylinder unit 121 is connected to the arms 118a and 119a of the scissor unit 112. In the collapsed state, the arms of the units 111 and 112 are collapsed in stacked relation between the arms of the top and bottom units 110 and 113. The four linkage scissor apparatus establishes a collapsed state with four sections in the space of a conventional three linkage scissor apparatus.

Although shown to a typical single lift arm set for each scissor unit, the same system can be readily applied to the various dual arm sets such as widely used in prior art systems.

Various modes of carrying out the invention are contemplated as being within the scope of the following claims particularly pointing out and distinctly claiming the subject matter which is regarded as the invention.

We claim:

1. A scissors lift apparatus for supporting of personnel in various elevated positions, comprising a base support unit, at least three scissor units mounted in vertical stacked and substantially vertically aligned relationship and including a first scissor unit having a bottom end secured to a base unit and adapted to be opened upwardly therefrom with a top end extended upwardly, a second scissor unit having a lower end with a connection to the top end of said first scissor unit and adapted to be opened upwardly therefrom with a top end of the second scissor unit extended upwardly, a third scissor unit having a lower end with a connection to the top end of the second scissor unit and having a top end, a support structure secured to the top end of the third scissor unit, each of said scissor units having a first scissor arm and a second scissor arm mounted adjacent in side-by-side orientation and pivotally connected to each other, said second scissor unit having its first and second scissor arms closely spaced and each of said first and third scissor units having said first and second scissor arms spaced laterally of each other and located to the opposite sides of said first and second scissor arms of said second scissor unit and having the ends of said scissor arms connected to form said connections of said scissor units, said first arms of said first and third scissor units and said second arms of said first and third scissor units being substantially aligned and whereby collapse of said scissor units moving and locating said first and second arms of said second scissor units between said first and second scissor arms of said first and third scissor units thereby providing a compact storage of said scissor units with said second scissor unit located in overlapping relation with both said first and third scissor units.

2. The scissor lift apparatus of claim 1 wherein said support unit includes four wheel chassis unit having a front set of laterally spaced wheels and a rear set of laterally spaced wheels, said front set and said rear set being longitudinally spaced, a chassis mounted on said wheels and including a central chamber projecting downwardly between said laterally spaced wheels and defining a scissor chamber unit between said laterally spaced wheels, said first scissor unit having said bottom end secured to the vertically inner portion of said chamber, said chassis having auxiliary chambers secured to said chamber unit between said spaced wheels.

3. The lift apparatus of claim 1 wherein said scissor arms of said first and third scissor units are tubular members having a rectangular cross-section with lateral width less than the vertical heights, and said scissor arms of said second scissor unit are tubular members having a substantially square cross-section.

4. The lift apparatus of claim 1 wherein said scissor arms of said first and third scissor units have a heighth to width ratio of substantially three to one.

5. The lift apparatus of claim 1 wherein said scissor arms of said first and third scissor units have a heighth to width ratio of substantially four to one.

6. The lift apparatus of claim 1 having first and second cylinder units coupled to said second scissor unit for expanding and contracting of said second scissor unit and thereby simultaneously said first and third scissor units.

7. The lift apparatus of claim 6 including a fourth scissor unit connected between said first scissor unit and said second scissor unit, said first cylinder unit being connected to said first scissor unit and said fourth scissor unit and said second cylinder unit being connected to said second scissor unit and said third scissor unit.

8. The lift apparatus of claim 6 having a center pivot unit connecting said first and second scissor arms of said second scissor units, a crank member secured to a first of said arms of said second scissor unit and having a first end extending upwardly of said pivot unit toward the first end of said arm and a second end extending downwardly therefrom toward the second end of said arm, said first cylinder unit being connected to the first end of the crank member and to the first end of said second arm and being vertically aligned with said second arm, said second cylinder unit being connected to the second end of the crank member and the second end of said second arm and being vertically aligned with said second arm.

9. The lift apparatus of claim 1 having a set of laterally spaced steering wheels and a set of laterally spaced following wheels, said sets of wheels being longitudinally spaced and mounted to said support unit, said support unit having wheel wells accommodating each of said wheels with an overlying horizontal top wall and an inner vertical side wall to at least one side of said wheels,
 first and second caster steering units secured to said support unit and connected one each to each of said steering wheels, each of said caster steering unit having a kingpin unit including a kingpin pivotally mounted to said top wall overlying said corresponding steering wheel, said kingpin having a vertical axis of rotation aligned with said steering wheel and with said vertical axis of rotation offset outwardly of the sidewall from a vertical plane through the center of said steering wheel.

10. The apparatus of claim 9 having said following wheels are rotatably mounted to said sidewalls and include horizontally aligned lateral axii of rotation, a brake unit mounted to said chassis in alignment with said axii and including a cylinder unit having a cylinder and a piston rod projecting from one end of said cylinder, a brake rod secured to the opposite end of said cylinder from said piston rod and having an axis in alignment with said piston rod, a first journal unit mounted to said chassis adjacent a first of said following wheels and with an axis in alignment with said wheel axii, a second journal unit secured to the chassis adjacent the second of said following wheels and with its axii in alignment with said wheel axii, said piston rod being journaled in said second journal unit and supporting said cylinder between said journal units whereby said cylinder is free to move on said axii of said wheels, power means for expanding said piston rod and said cylinder in opposite directions for moving of said brake rods in opposite directions and into braking engagement with said adjacent following wheels, said power means operable to collapse said piston rod into said cylinder and simultaneously retract said piston rod and said brake rods from said following wheels to simultaneously release said following wheels.

11. The lift apparatus of claim 1 including at least one set of laterally spaced wheels rotatably mounted to said support unit with a common axii of rotation, a brake unit mounted to said support unit in alignment with said axii and including a cylinder unit having a cylinder and a piston rod projecting from one end of said cylinder and terminating in a first brake pin, a second brake pin secured to the opposite end of said cylinder from said piston rod, said piston rod and second brake pin having an axis in alignment with said axii of said wheels, a first journal unit and a second journal unit mounted to said support unit, said piston rod and second brake pin being slidably mounted in said first journal unit for movement on said axii, said second brake pin slidably mounted in said second journal unit and supporting said cylinder to move on said axii of said wheels, power means for positioning said piston rod and said cylinder in opposite directions and selectively moving said brake pins in a first direction locating said brake pins spaced from said wheels whereby said wheels are free to rotate and in a second direction locating said brake pins engaging said wheels in braking engagement whereby said wheels are prevented from rotating.

12. The lift apparatus of claim 1 including a set of laterally spaced first and second steering wheels and a set of laterally spaced following wheels, said sets of wheels being longitudinally spaced and mounted to said support unit, said support unit having wheel wells accommodating each of said wheels with an overlying horizontal top wall and including a central chamber unit including laterally spaced sidewalls located adjacent said wheels and extending downwardly from said top wall below the axial of said wheels to define a chamber substantially extending throughout the vertical depth of said support unit, said wheels being mounted to said sidewalls, said first scissor units mounted within said chamber unit adjacent to the bottom of said chamber and said scissor apparatus in a collapsed state located within said chamber unit,
 a caster steering assembly including a first kingpin unit and a second kingpin unit for said chassis and connected to first and second said steering wheels, each said kingpin unit having kingpin pivotally mounted to said corresponding top wall of said wheel well, said kingpin having a vertical axis of rotation aligned with said corresponding steering wheel and with said vertical axis of rotation laterally offset from a vertical plane through said wheel, with said wheel in a straight forward orientation.

13. The apparatus of claim 12 including auxiliary chamber walls secured to said sidewalls and extended outwardly between said steering wheels and follower wheels for accommodating auxiliary equipment.

14. The apparatus of claim 13 wherein said follower wheels are rotatably mounted to said sidewalls and having horizontally aligned lateral axii of rotation, a brake unit mounted to said support unit in alignment with said axii and including a cylinder unit having a cylinder and a piston rod projecting from one end of said cylinder and having an outer end forming a first brake rod, a second brake rod secured to the opposite end of said cylinder from said piston rod and having an axis in alignment with said piston rod, a journal assembly secured to the support unit, said piston rod and said brake rod being journaled in said journal assembly and supporting said cylinder for movement on said axii of said steering wheels, a power assembly coupled to said cylinder for expanding said piston rod and said cylinder for moving of said first and second brake rods outwardly into braking engagement with said adjacent follower wheel, said power assembly being further operable to collapse said piston rod into said cylinder and thereby simultaneously retract said first and second brake rods from said follower wheels to simultaneously release said follower wheels for rotation.

15. A multiple section scissor lift apparatus for supporting of a platform upon a base structure for selective elevation of the platform with respect to a base support structure comprising a plurality of vertically expandable and collapsible scissor units each of which includes a first and second centrally pivoted scissor arms, said plurality including at least three scissor units including a lower scissor unit and an upper scissor unit and a central scissor unit interconnecting said lower scissor unit to said upper scissor unit, said first and second scissor arms of said central scissor unit being located in adjacent close spaced relation and having exterior sides, said each of said first and second scissor arms of said lower and upper scissor units each being located in similar lateral spaced relation with a spacing of the first and second scissor arms being slightly greater than the total width of said first and second scissor arms of said central scissor unit, connections securing said first and second arms of said upper and lower scissor units to the exterior sides of said first and second arms of said central scissor unit whereby said arms of said lower and upper scissor units are located to the exterior of said exterior sides of said central scissor unit and said central scissor unit arms fold into said lower and upper scissor units in the collapsed position of said scissor lift apparatus.

16. The scissor lift apparatus of claim 15 having a center pivot units connecting said scissor arms of said central scissor unit and having aligned first ends and aligned second ends, a crank member secured to said pivot unit of said central scissor unit and having a first end extending upwardly of said pivot unit toward the first end of said arms, a second end extending downwardly therefrom toward the second end of said arms, said first cylinder unit being connected to the end of said first crank member and to a first end of one of said arms of said central scissor unit and being vertically aligned with said one of said arm, said second cylinder unit being connected to the second end of said crank member and a second end of said one of said arms of said central scissor unit and being vertically aligned with said one of said arms.

17. The lift apparatus of claim 15 having a hydraulic cylinder lift assembly secured to the arms of said central scissor unit and operable to expand and contract the arms of said central scissor unit and thereby all of the arms of the upper and lower scissor units simultaneously with the expansion and contraction of the central scissor unit.

18. The apparatus of claim 15 wherein said support structure includes an upper planar surface and a wheeled chassis for over-the-road transport and having a central scissor chamber within which said scissor units are folded in the collapsed position with the platform in close spaced relation to the upper planar surface of said support structure.

19. A mobile lift apparatus comprising a wheeled chassis having a set of laterally spaced steering wheels and a set of laterally spaced following wheels, said sets of wheels being longitudinally spaced and mounted to said chassis, a scissors lift apparatus having vertically interconnected scissor units mounted on said chassis, a caster steering assembly secured to said chassis and having a caster steering unit connected to each of said steering wheels, each caster steering unit having a kingpin unit having a kingpin pivotally mounted to said chassis, said kingpin having a vertical axis of rotation aligned with said wheel and with said vertical axis of rotation laterally offset from a vertical plane through said wheel.

20. A mobile lift apparatus, comprising a support structure, laterally spaced wheels rotatably mounted to said support structure with a common axii of rotation, a brake unit mounted to said support structure in alignment with said axii and including a cylinder unit having a cylinder and a piston rod projecting from one end of said cylinder and terminating in a first brake pin, a second brake pin secured to the opposite end of said cylinder from said piston rod, said piston pin and brake rod having an axis in alignment with said axii of said wheels, a first journal unit mounted to said support structure adjacent a first of said wheels with an axis in alignment with said wheel axii, a second journal unit secured to the support structure adjacent the second of said wheels and with its axis in alignment with said wheel axii, said piston rod and first brake pin being journaled in said first journal unit and said second brake pin being journaled in said second journal units and supporting said cylinder between said journal units whereby said cylinder is free to move on said axii of said wheels, power means for positioning said piston rod and said cylinder in opposite directions for moving of said brake pins in one direction for locating said brake pins spaced from said wheels and in a second direction for locating said brake pins in braking engagement with said wheels.

21. A mobile lift apparatus comprising a wheeled chassis having a set of laterally spaced steering wheels and a set of laterally spaced following wheels, said sets of wheels being longitudinally spaced and mounted to said chassis, said chassis having wheel wells accommodating each of said wheels and each wheel well having an overlying horizontal top wall and an inner depending vertical sidewall to at least one side of said corresponding accommodated wheel, a central chamber including laterally spaced sidewalls located adjacent said wheels and extending downwardly below the axial of said wheels to a bottom wall to define a chamber substantially extending throughout the vertical depth of said chassis, said wheels being mounted to said corresponding vertical sidewall of said corresponding wheel well, a multiple sectioned scissors lift having at least three scissor units in vertically interconnected relationship, a lowermost unit of said scissor units mounted within said chamber adjacent to the bottom wall of said chamber and said scissor apparatus in a collapsed state located within said chamber, a caster steering assembly secured to said chassis and connected to said steering wheels, said caster steering assembly having a kingpin unit for each steering wheel, each kingpin unit includes a kingpin pivotally mounted to said top wall of said corresponding wheel well, said kingpin having a vertical axis of rotation aligned with said wheel and with said vertical axis of rotation laterally offset outwardly of the corresponding vertical sidewall from a vertical plane through said wheel, with said wheel in a straight forward orientation.

22. The apparatus of claim 21 wherein said chassis includes wall units secured to said chamber sidewalls and extended outwardly between said steering wheels and following wheels for accommodating auxiliary equipment.

23. The apparatus of claim 21 wherein said following wheels are rotatably mounted to said sidewalls and having horizontally aligned lateral axii of rotation, a brake unit mounted to said chassis in alignment with said axii and including a cylinder unit mounted having a cylinder and a piston rod projecting from one end of said cylinder, a brake rod secured to the opposite end of said cylinder from said piston rod and having an axis in alignment with said piston rod, a first journal unit mounted to said chassis adjacent a first of said following wheels and with an axis in alignment with said wheel axii, a second journal unit secured to the chassis adjacent the second of said following wheels and with its axis in alignment with said wheel axii, said piston rod being journaled in said first journal unit and said brake rod being journaled in said second journal unit and supporting said cylinder between said journal units whereby said cylinder is free to move on said axii of said wheels, power means for expanding said piston rod and said cylinder in opposite directions for moving of said brake rods in opposite directions and into braking engagement with said adjacent following wheel, said positioning system operable to collapse said piston rod into said cylinder and simultaneously retract said piston rod and said brake rod from said following wheels to simultaneously release said wheels.

* * * * *